(12) United States Patent
Ambs et al.

(10) Patent No.: US 10,228,077 B2
(45) Date of Patent: Mar. 12, 2019

(54) FLUIDIZING BUTTERFLY VALVE, AND SYSTEM

(71) Applicant: THE YOUNG INDUSTRIES, INC., Muncy, PA (US)

(72) Inventors: Richard W. Ambs, Williamsport, PA (US); Joseph Anthony Hauser, Williamsport, PA (US)

(73) Assignee: THE YOUNG INDUSTRIES, INC., Muncy, PA (US)

( * ) Notice: Subject to any disclaimer, the term of this patent is extended or adjusted under 35 U.S.C. 154(b) by 59 days.

(21) Appl. No.: 15/459,360

(22) Filed: Mar. 15, 2017

(65) Prior Publication Data

US 2018/0266585 A1 Sep. 20, 2018

(51) Int. Cl.
*F16K 39/02* (2006.01)
*F16K 1/22* (2006.01)
*B65G 53/18* (2006.01)

(52) U.S. Cl.
CPC .......... *F16K 39/028* (2013.01); *B65G 53/18* (2013.01); *F16K 1/22* (2013.01)

(58) Field of Classification Search
CPC .......... F16K 39/028; F16K 1/22; F16K 1/221; F16K 1/222; B65G 53/18; B65G 53/38
USPC ...... 251/305, 308; 406/89–91, 138; 222/195
See application file for complete search history.

(56) References Cited

U.S. PATENT DOCUMENTS

| 2,921,721 | A | 1/1960 | Brooks |
| 3,399,931 | A | 9/1968 | Vogt |
| 3,612,307 | A | 10/1971 | Vogt |
| 4,140,147 | A | 2/1979 | Van't Sant |
| 4,573,504 | A | 3/1986 | Rosenstroem |
| 7,231,947 | B2 | 6/2007 | Boroch et al. |
| 7,244,087 | B2 | 7/2007 | Wilson et al. |
| 7,581,905 | B2 * | 9/2009 | Berggren ............... B65D 88/28 406/90 |
| 2005/0269369 | A1 | 12/2005 | Pfeiffer et al. |
| 2008/0315143 | A1 | 12/2008 | Mendoza et al. |
| 2009/0004530 | A1 | 1/2009 | Koenig et al. |
| 2014/0299803 | A1 * | 10/2014 | Hansen ............... F16K 1/2285 251/92 |
| 2018/0087689 | A1 * | 3/2018 | Tchakam-Tchasso ....... F16K 39/028 |

FOREIGN PATENT DOCUMENTS

| DE | 10057155 A1 | 4/2002 |
| GB | 2279429 A | 1/1995 |
| JP | H11156528 A | 6/1990 |
| WO | 8911378 A1 | 11/1989 |

(Continued)

OTHER PUBLICATIONS

Trans-Flow®, Aeration Products, The Young Industries, Inc, Bulletin 265-200-1, 2000-2001.

(Continued)

*Primary Examiner* — Kevin Murphy
*Assistant Examiner* — Kelsey Cary
(74) *Attorney, Agent, or Firm* — Vorys, Sater, Seymour and Pease LLP

(57) ABSTRACT

A fluidizing butterfly valve. The fluidizing butterfly valve includes a valve body and a fluidizing valve disk or member configured to fluidize material located above the butterfly valve and/or material moving through the butterfly valve.

25 Claims, 12 Drawing Sheets

(56) References Cited

FOREIGN PATENT DOCUMENTS

WO    WO 2016207107 A1 * 12/2016 ........... F16K 39/028

OTHER PUBLICATIONS

Delta T Products, Ductile Iron & Stainless Steel Butterfly Valves 2"-24" 200/150 PSI Bi-Directional Service, www.deltaTproducts.com, Feb. 3, 2015.
Dynapore®, Fluidizing media for bulk powder handing and processing, The high-strength cleanable easily fabricated porous metal sheet for all fluidizing applications, Martin Kurz & Co., Inc., 1999.

* cited by examiner

FLUIDIZING BUTTERFLY VALVE, AND SYSTEM

FIELD

The present invention is directed to a fluidizing butterfly valve, for example, a fluidizing butterfly valve configured to fluidize powdered material located above and/or passing through the butterfly valve pivoting disk or member to facilitate opening thereof as well as ensuring free flow of the powdered material once the valve has been opened.

BACKGROUND

The retrieval of dry, granular bulk solids by gravity from storage vessels requires usage of some type of valve to start, stop, and/or modulate the flow rate of the bulk solids from the vessel.

Sliding gate valves have traditionally been a preferred choice for this type of valve application, primarily due to the unobstructed flow channel through the valve when it is fully open and the motion of the gate when it opens, which does not compress or displace any of the bulk solids located above the valve.

Sliding gate valves have disadvantages, especially when handling very fine, fluidizable powders. Some of the disadvantages are as follows:

- shutoff of sliding gate valves used for powder handle having a metal-to-metal seat is not perfectly tight, resulting in continuous trickling of powder. This can result in waste, poor batching accuracy and inter-batch contamination;
- sliding gate valves can be expensive especially when corrosion-resistant construction is required;
- sliding-gate valves can be quite large and heavy, making installation problematic;
- larger sizes of sliding-gate valves tend to operate very slowly when opening and closing;
- the large actuating cylinders used by sliding-gate valves consume large quantities of compressed air;
- "bonnetless" sliding-gate valves, commonly used for dry solids handling, can leak fine powders externally, creating a housekeeping problem (Note: "bonnetless" knife gate valves are the most common type of gate valve used for dry solids handling); and
- sliding-gate valves can retain bulk material in internal dead spots, particularly, if used in partially-open flow modulation applications.

By comparison, butterfly valves also have disadvantages, namely a reduced and more likely to plug flow channel due to the presence of the valve disk across its diameter. The upward motion of half of the disk when the valve opens also tends to compress and pack the mass of dry bulk material resting upon it, increasing the likelihood of flow blockage.

The advantages of butterfly valves, by comparison to slide valves (i.e. point-by-point comparison with sliding gate valves discussed above) are as follows:

- tight shutoff due to use of an elastomeric valve seat compared to the metal-to-metal seat of knife gate valves suitable for solids handling (butterfly valves are also available with inflatable seats, which allow for smaller actuators and longer seat life);
- lower cost due to smaller amount of corrosion-resistant materials used in the valve body;
- more compact valve body and actuator and better ability to use lightweight materials in the valve body compared with sliding-gate valves;
- butterfly valves can open and close more quickly than sliding-gate valves unless special control valves, local compressed air storage, and actuator cylinders are provided for the sliding-gate valve;
- actuators for butterfly valves typically employ short-stroke (e.g. 90°) rotary actuators compared to the long-stroke linear actuators of sliding-gate valves;
- butterfly valves are sealed to the environment much more effectively than sliding-gate valves; and
- there are minimal dead spots in butterfly valves for retention of material when fully open.

The butterfly valve according to the present invention provides significant improvements and advantages when handling dry bulk solids, in particular cohesive powders.

SUMMARY

The presently described subject matter is directed to an improved butterfly valve and system.

The presently described subject matter is directed to an improved butterfly valve disk or member of a butterfly valve and system.

The presently described subject matter is directed to a fluidizing butterfly valve and system.

The presently described subject matter is directed to a fluidizing butterfly valve disk or member of a butterfly valve and system.

The presently described subject matter is directed to a fluidizing butterfly valve and system configured to fluidize material located above the fluidizing butterfly valve.

The presently described subject matter is directed to a butterfly valve, comprising or consisting of a valve body having a flow channel extending through the valve body; a butterfly valve disk or member rotatably disposed within the valve body and configured to open and close the flow channel; and a rotatable shaft connected to the butterfly valve disk or member for opening and closing the butterfly valve disk or member within the valve body, wherein the butterfly valve is configured to fluidize material located above the butterfly valve disk or member in a manner to facilitate opening the butterfly valve disk or member of the butterfly valve. The butterfly valve disk or member is, for example, a pivoted disk.

In particular the butterfly valve disk or member (e.g. pivoted disk) comprises a fluidizing butterfly valve disk or member rotatably disposed within the valve body and configured to open and close the flow channel.

Preferably the fluidizing butterfly valve disk or member has an upper fluidizing surface, wherein the upper fluidizing surface of the fluidizing butterfly valve disk or member is configured to fluidize material located above the fluidizing butterfly valve disk or member in a manner to facilitate opening of the butterfly valve disk or member of the butterfly valve.

Preferably the butterfly valve disk or member of the present invention is a fluidizing butterfly valve disk or member having a fluidizing chamber or plenum defined by a fluidizing membrane configured to fluidize the material located above the fluidizing butterfly valve disk or member.

In addition to or in the alternative to the upper fluidizing surface, the butterfly valve disk or member of the invention is a fluidizing butterfly valve disk or member configured to fluidize the material locate below the fluidizing butterfly valve disk or member, wherein the fluidizing butterfly valve disk or member comprises a lower fluidizing surface.

Preferably the fluidizing butterfly valve disk or member comprises the upper fluidizing surface and the lower fluidizing surface.

Preferably the fluidizing butterfly valve disk or member, of butterfly valves of the invention comprising an upper fluidizing surface, comprises an upper fluidizing plate having the upper fluidizing surface. In the alternative, the fluidizing butterfly valve disk or member, of butterfly valves of the invention comprising an upper fluidizing surface, comprises an upper fluidizing screen having the upper fluidizing surface.

The presently described subject matter is directed to a butterfly valve, comprising or consisting of a valve body having a flow channel extending through the valve body; a butterfly valve disk or member rotatably disposed within the valve body and configured to open and close the flow channel; and a rotatable shaft connected to the butterfly valve disk or member for rotatably supporting the butterfly valve disk or member and configured for opening and closing the butterfly valve disk or member within the valve body, wherein the butterfly valve is configured to fluidize material located above and/or below the butterfly valve disk or member in a manner to fluidize material located above the butterfly valve disk or member to facilitate opening the butterfly valve disk or member of the butterfly valve and continue to fluidize material moving through the flow channel of the valve body.

Preferably the butterfly valve of the invention is configured to fluidize material passing through the flow channel of the butterfly valve.

Preferably the rotatable shaft of the butterfly valve of the invention is a spindle or axle.

Preferably the fluidizing butterfly valve disk or member of the invention comprises at least one fluidizing valve member having a fluidizing plate which defines a fluidizing chamber (e.g. fluidizing plenum) configured for distribution of the fluidizing gas.

Preferably the butterfly valve disk or member of the butterfly valve of the invention is a fluidizing butterfly valve disk or member configured to fluidize the material located above the fluidizing butterfly valve disk or member, wherein the fluidizing butterfly valve disk or member of the invention comprises a fluidizing chamber configured for distribution of the fluidizing gas.

Preferably the fluidizing butterfly valve disk or member of the butterfly valve of the invention comprises a butterfly valve base disk or base member and a fluidizing plate connected to the butterfly valve base disk or base member.

Preferably the fluidizing butterfly valve disk or member of the butterfly valve of the invention comprises a butterfly valve base disk or base member and a fluidizing plate connected to the butterfly valve base disk or base member, wherein an upper surface of the butterfly valve base disk or base member and a lower surface of the fluidizing plate define a fluidizing chamber therebetween.

Preferably the fluidizing butterfly valve disk or member of the butterfly valve of the invention comprises a fluidizing chamber, and the rotatable shaft is provided with a fluid passageway extending from an end of the rotatable shaft to the fluidizing chamber.

Preferably the fluidizing butterfly valve disk or member of the butterfly valve of the invention comprises a butterfly valve base disk or base member and a fluidizing plate connected to the butterfly valve base disk or base member, wherein the fluidizing plate comprises at least one through hole. More preferably the fluidizing plate comprises multiple through holes.

The presently described subject matter is directed to a butterfly valve, comprising or consisting of a valve body having a flow channel extending through the valve body; a butterfly valve disk or member rotatably disposed within the valve body and configured to open and close the flow channel; and a rotatable shaft connected to the butterfly valve disk or member for opening and closing the butterfly valve disk or member within the valve body, wherein the butterfly valve is configured to fluidize material located above the butterfly valve disk or member in a manner to facilitate opening the butterfly valve disk or member of the butterfly valve, wherein the fluidizing butterfly valve disk or member comprises an upper fluidizing membrane. Preferably the fluidizing butterfly valve disk or member comprises an upper fluidizing membrane and a lower fluidizing membrane.

Preferably the upper fluidizing membrane, and the lower fluidizing membrane (if present), comprise a respective porous stainless steel sheet.

The present invention is directed to an improved butterfly valve such as a fluidizing butterfly valve, and a butterfly valve system comprising the fluidizing butterfly valve. The fluidizing butterfly valve is configured to fluidize material to facilitate opening the fluidizing butterfly valve and/or enhance flow through the butterfly valve, and the system comprises or consists of the fluidizing butterfly valve and a fluid supply connected together. The fluid supply is preferably a source of pressurized air or gas, e.g., nitrogen gas. However, in the alternative it may be a source of pressurized liquid.

Preferably the fluidizing butterfly valve and system is applied to a lower exit end of a material hopper to fluidize bulk granular or powder material stored in the hopper immediately above the fluidizing butterfly valve. For example, if the fluid supply is a source of pressurized air or gas then the stored bulk material could be a dry cohesive powder such as titanium dioxide ($TiO_2$).

The presently described subject matter is directed to a butterfly valve system, comprising or consisting of a butterfly valve, the butterfly valve comprising or consisting of a valve body having a flow channel extending through the valve body; a butterfly valve disk or member rotatably disposed within the valve body and configured to open and close the flow channel; and a rotatable shaft connected to the butterfly valve disk or member for opening and closing the butterfly valve disk or member within the valve body, wherein the butterfly valve is configured to fluidize material located above the butterfly valve disk or member in a manner to facilitate opening the butterfly valve disk or member of the butterfly valve.

The presently described subject matter is directed to a butterfly valve system, comprising the butterfly valve comprising or consisting of a butterfly valve, comprising or consisting of a valve body having a flow channel extending through the valve body; a butterfly valve disk or member rotatably disposed within the valve body and configured to open and close the flow channel; and a rotatable shaft connected to the butterfly valve disk or member for opening and closing the butterfly valve disk or member within the valve body, wherein the butterfly valve is configured to fluidize material located above the butterfly valve disk or member in a manner to facilitate opening the butterfly valve disk or member of the butterfly valve, further comprising a fluid supply connected to the butterfly valve. Any of the above-listed preferred variations of the butterfly valve are also preferred variations for the butterfly valve of this system.

The fluidizing butterfly valve is configured to fluidize bulk granular or powdered material. For example, the butterfly valve can comprise or consist of a valve body and a rotatable fluidizing butterfly valve disk or member configured to fluidize the bulk granular or powdered material. Alternatively, or in addition, the valve body can be configured to fluidize the material.

The fluidizing butterfly valve disk or member, for example, can comprise a butterfly valve disk or member (e.g. butterfly plate or disk) having a fluidizing membrane. For example, the butterfly valve disk or member can be provided with the fluidizing membrane provided on one or both sides of the butterfly valve disk or member (e.g. upper side, lower side, or both sides). For example, the fluidizing butterfly valve can comprise or consist of a fluidizing butterfly valve disk or member having a porous metal plate (preferably porous stainless steel plate). An example of a preferred porous stainless steel plate is TRANS-FLOW aeration media or fluidizing membrane as supplied by The Young Industries, Inc. of Muncy, Pa. 17756). TRANS-FLOW is a registered U.S. trademark of Young Industries, Inc. (Registration No. 1,796,761).

The TRANS-FLOW aeration media or fluidizing membrane is constructed of porous 316 stainless steel with a smooth finished contact surface configured to prevent powders and bulk solids from adhering to the media or fluidizing membrane. This configuration produces an evenly distributed layer of air that separates the bulk material from the media. An analogy for this configuration is that the media or fluidizing membrane of this configuration functions similar to an air hockey table, in which air separates the hockey puck from the surface of the table so the hockey puck glides on a frictionless air layer. The TRANS-FLOW media is able to withstand temperatures of up to 1000 degrees F. and resists corrosion, and utilizes typically only 3-5 psig of pressurized fluid (e.g. air, gas) over the internal pressure level, for example, in the material flow channel extending through the butterfly valve. The maximum recommended pressure is 15 psig. Alternatively, the fluidizing membrane can be a fluidizing plate or fluidizing screen provided on one or both sides of the fluidizing butterfly valve disk or member, or a textile media such as Bindicator "BIN-FLO", which consists of a diffuser made of cotton attached or fiberglass covered with a coarse screen.

For example, the TRANS-FLOW fluidizing membrane fabricated from porous stainless steel material is welded to at least one side or face of the butterfly valve disk defining one or more fluidizing chambers therein, and configured to receive compressed air from a pressure regulated and filtered source of dry compressed air or gas (e.g. air tank having air regulator). For example, compressed air can be supplied by a connection to a plant compressed air or inert gas system.

For example, the butterfly valve disk or member can comprise a fluidizing chamber for receiving a fluid (e.g. air, gas, mixture) to be dispersed through the fluidizing membrane. A fluid supply (e.g. air injector or pump) can be provided to supply the fluidizing chamber with the fluid. For example, the fluidizing valve member comprises a rotatable shaft having a fluid passageway configured for supplying fluid from the fluid supply to the fluidizing chamber.

Alternatively, or in addition, the valve body of the fluidizing butterfly valve can be configured to be a fluidizing valve body. For example, one or more air passageways, ports, and/or jets can deliver pressurized fluid (e.g. compressed air or gas) into the flow channel of the valve body to facilitate fluidizing material located above the valve and/or facilitate fluidizing material flowing through the fluidizing butterfly valve. Alternatively, TRANS-FLOW fluidizing membrane can be provided on surfaces of the fluid channel extending through the fluidizing butterfly valve, and/or supplied air or gas (e.g. air or gas passageways, ports, and/or jets in the valve body).

The term "butterfly valve" denotes a class of valves, which employ a circular disk as a flow interrupting element rotatable about a rotatable shaft or about trunnions placed upon or nearly upon a diameter of the valve body's flow channel. The disk may be described as a spherical segment. Trunnion type valves place the centerline of the trunnions at different locations relative to the spherical segment disk.

The butterfly valve of the present application can be a "concentric" valve in which the disk comprises a spherical segment centered at its sphere's diameter and with the sphere's center on the axis of the trunnions and located at the center of the valve's flow channel. This style of valve often employs elastomeric seats.

There are other types of butterfly valves which may not have elastomeric seats and in which the spherical segment disk element is offset from the axis of the trunnions. The extreme situation, where the spherical segment of the disk of the valve is only cut by a single plane, defines a "dome" valve or "segmented ball" valve. The disk of this class of valves slides under, and does not move up into the material above it. There may be embodiments of this type of valve in which an inflatable seal is used in the valve body opposite the disk, which allows for clearance between the inflatable seat and the disk when the valve is ready to be opened. In such a design, a flow channel diameter TRANS-FLOW surface on the disk might be useful. The same would be true of the same style of valve in which the trunnion axes are on eccentrics, where the disk would be rotated into place with clearance to its seat and the eccentrics would then operate to mechanically push the disk into the seat.

DETAILED DESCRIPTION

A fluidizing butterfly valve 10 is shown in FIGS. 1-4. This fluidizing butterfly valve 10 comprises a lug-type valve body 12 having an elastomeric seal 14, and a fluidizing butterfly valve disk or member 16 rotatably disposed within the valve body 12. The valve body 12 can be provided with holes 12A (e.g. un-threaded through holes on wafer-type housing or threaded holes on lug-type housing) for receiving cap screws or bolts for connecting the fluidizing butterfly valve 10 to a lower exit end of a bulk material hopper.

Figure 4:
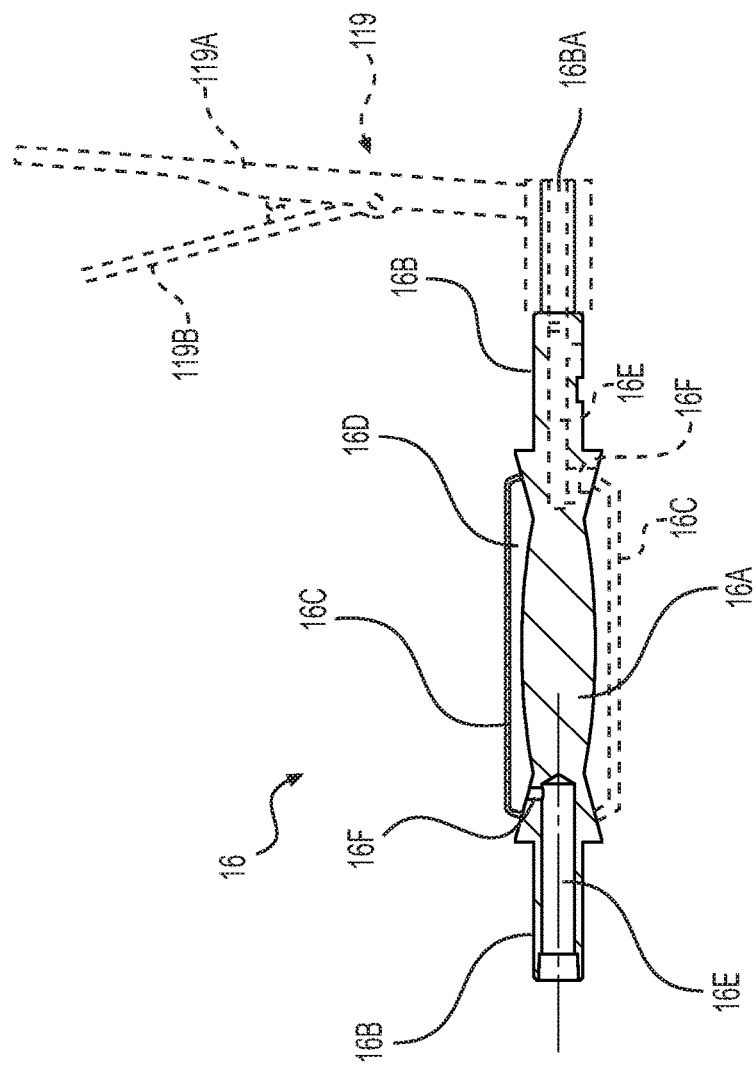
FIG. 4 is a cross-sectional side view of the butterfly valve disk or member.

The fluidizing butterfly valve disk or member 16 comprises a valve base disk 16A, a rotatable shaft 16B (i.e. rotatable disk support), a TRANS-FLOW fluidizing membrane 16C, and a fluidizing chamber 16D, as shown in FIG. 4. For example, the fluidizing butterfly valve can comprise a fluidizing butterfly valve disk or member having a porous metal plate (e.g. porous stainless steel plate such as TRANS-FLOW aeration media or fluidizing membrane as supplied by The Young Industries, Inc. of Muncy, Pa. 17756).

The TRANS-FLOW fluidizing membrane 16C (or aeration media) is constructed of porous 316 stainless steel with a smooth finished contact surface configured to prevent powders and bulk solids from adhering. This configuration produces an evenly distributed layer of air that separates the bulk material from the media. An analogy of its operation is that it works similar to an air hockey table. The TRANS-FLOW porous steel fluidizing membrane 16C is able to withstand temperatures of up to 1000 degrees F., resists corrosion, and utilizes typically only 3-5 psi of air or gas pressure above the internal pressure in the material flow channel of the fluidizing butterfly valve 10. The maximum recommended fluidizing relative supply pressure is 15 psi. Alternatively, the fluidizing membrane can be a fluidizing plate or fluidizing screen provided on one or both sides of the fluidizing butterfly valve disk or member.

The butterfly valve disk or member 16 is configured to open and close a flow channel 15 (FIG. 1) directing flow along a flow direction FD extending through the valve body 12. The butterfly valve disk or member 16 is mounted on the rotatable shaft 16B (FIG. 3) disposed within the valve body 12, and configured to rotate the butterfly valve disk or member 16 to open and close the butterfly valve 10. The outer end 16BA of the rotatable shaft 16B can be configured (e.g. flattened sides) to be fitted with a manual lever actuator 119 comprising a lever 119A having a handle 119B, as shown in FIG. 4, or a pneumatic, hydraulic, or electric actuator for rotating the rotatable shaft 16B and butterfly valve disk or member 16. Alternatively, the butterfly valve disk or member 16 can be fitted with a pneumatic, hydraulic, and/or electric actuator to rotate the rotatable shaft 16B and rotatable butterfly valve disk or member 16A.

Figure 1:
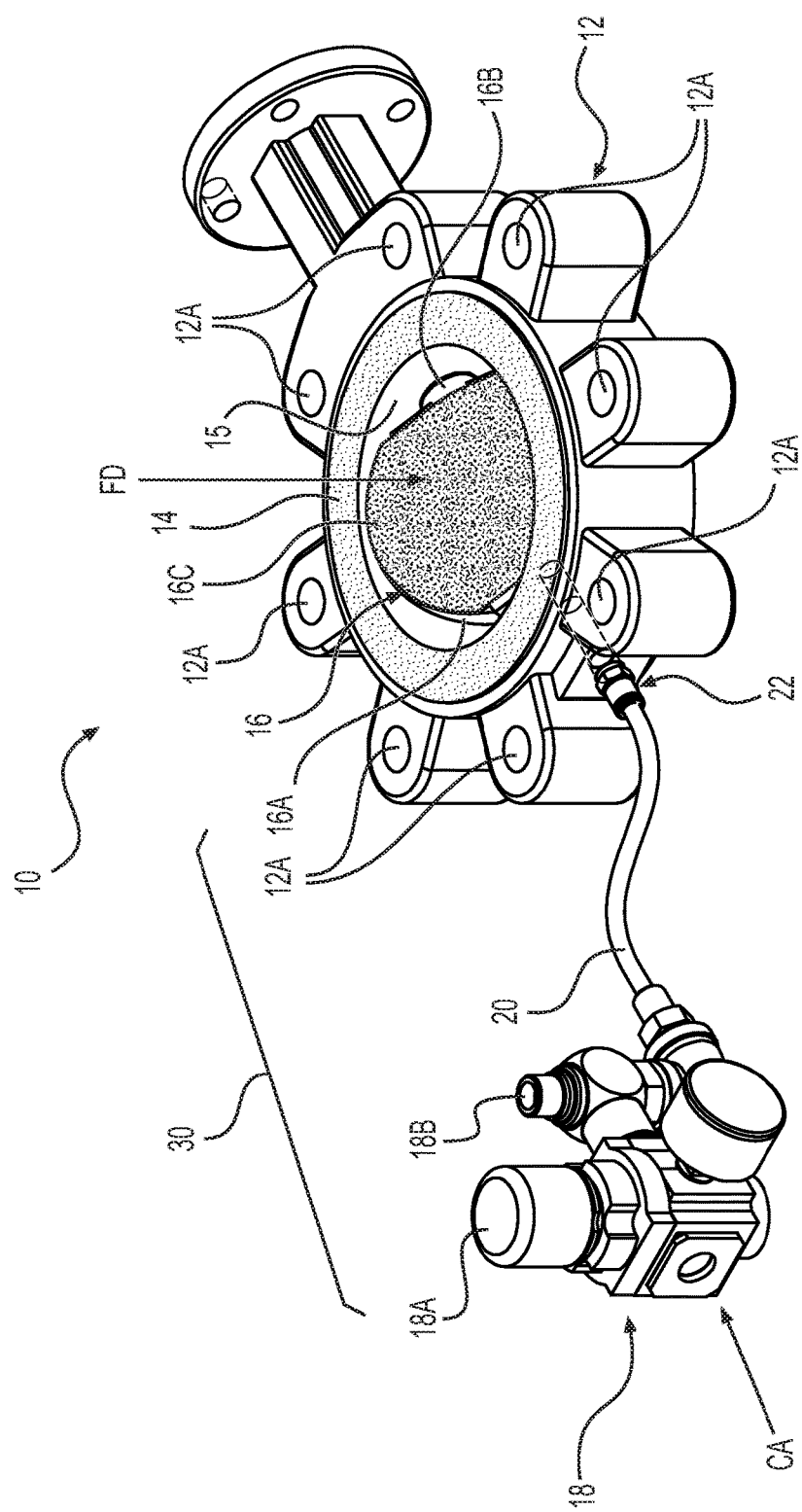
FIG. 1 is a perspective view of the butterfly valve according to the present invention.
Figure 2:
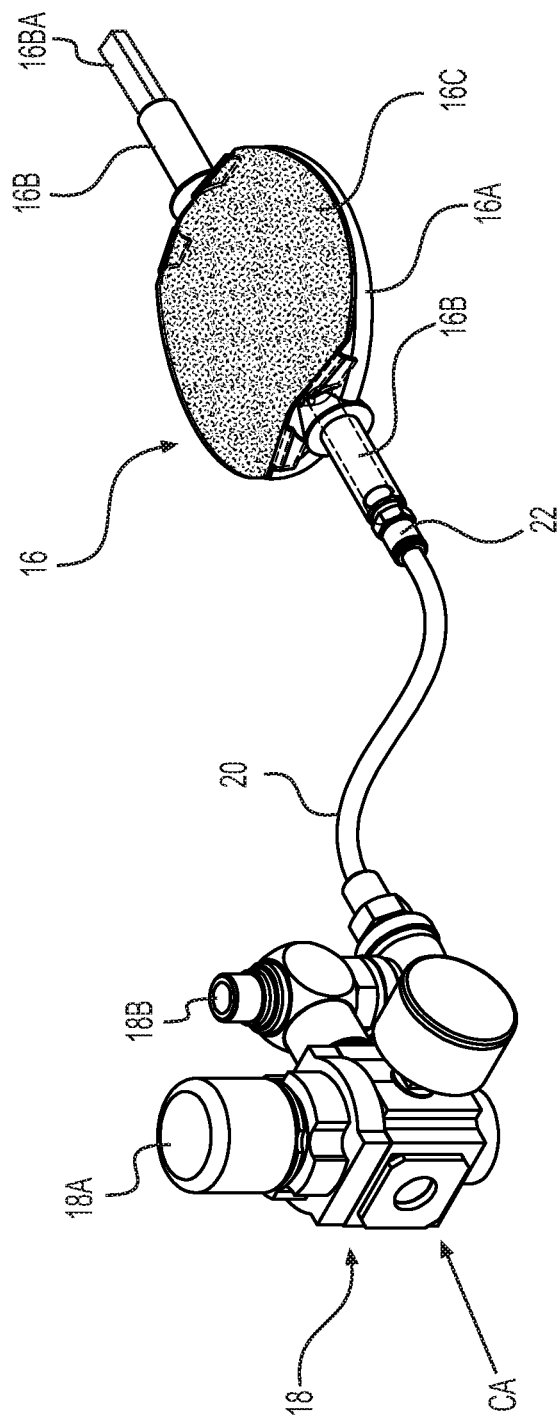
FIG. 2 is a perspective view of the butterfly valve disk or member and air supply assembly removed from the butterfly valve.
Figure 3:
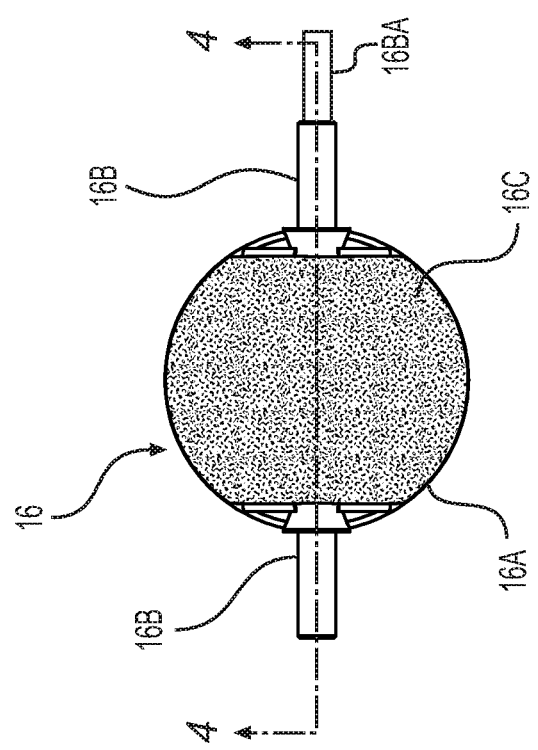
FIG. 3 is a top planar view of the butterfly valve disk or member.

A fluidizing butterfly valve system 30 comprises the fluidizing butterfly valve 10 connected to an air or gas supply 18, as shown in FIGS. 1 and 2. For example, the air or gas supply 18 can be connected to the fluidizing butterfly valve 10 via air or gas supply line 20 connected to an air or gas hose coupling 22 fitted to the rotatable shaft 16B (FIG. 2). The air or gas supply 18, for example, can be a filtered compressed air or gas supply and/or a motorized or electric air or gas pump. For example, the air or gas supply 18 receives compressed air or gas CG from a source (e.g. air or gas tank), and comprises an adjustable pressure regulator 18A and an adjustable flow control valve 18B.

The detailed configuration of the fluidizing butterfly valve disk or member 16 is shown in FIG. 4. Again, the fluidizing butterfly valve disk or member 16, for example, comprises a valve base disk 16A, a rotatable shaft 16B, a fluidizing membrane 16C, and a fluidizing gas chamber 16D or gas plenum.

Preferably the fluidizing membrane 16C is made of TRANS-FLOW porous steel. However, instead of using the TRANS-FLOW porous steel for fluidizing membrane 16C, the fluidizing membrane 16C may be, for example, a porous plate such as porous metal plate, porous stainless steel plate, porous aluminum plate, porous brass plate, porous ceramic plate, porous resin plate, porous composite plate (e.g. carbon, graphite, Kevlar, Boron), porous fiber plate, porous fiberglass plate, porous ceramic. Another alternative is to substitute a screen, or screen material for the TRANS-FLOW porous steel fluidizing membrane 16C. In another alternative, the fluidizing membrane 16C can be a fluidizing plate made (e.g. machined, drilled, water jetted, laser cut) to have multiple holes, slots, passageways and/or jets or passageways extending through the fluidizing plate. The holes, slots, passageways and/or jets can be in a particular pattern (e.g. matrix, radii, star, concentric circles). Further, the configuration of the holes, slots, passageways, and/or jets (e.g. different size, different profile, different cross-sectional shape, tapering, particular surface roughness and/or surface finish in holes, slots, passageways, and/or jets or outer surfaces) can be tailored to create various fluidizing effects.

The valve base disk 16A can be made (e.g., machined, punched, extruded, formed, molded) from metal or other suitable material (e.g., steel, aluminum, brass, ceramic, or composite, for example, fiber-reinforced composites (e.g. carbon, graphite, Kevlar, Boron), and have a center portion coextensive with the rotatable shaft 16B shown as one piece. Alternatively, the valve base disk 16A and the rotatable shaft 16B can be separate members, components, or parts assembled together.

The fluidizing membrane 16C is provided on an upper side of the valve base disk 16A, as shown in FIG. 4. Alternatively, the fluidizing membrane 16C can be provided on a lower side of the valve disk 16, or provided on both the upper side and lower side of the valve base disk 16A. The fluidizing membrane 16C on the upper side and/or lower side of the valve base disk 16A may be made of any of the above described materials for fluidizing membrane 16C. Moreover, if the fluidizing membranes 16C are provided on the upper side and lower side of the valve base disk 16A they may be made of the same or different materials.

The fluidizing membrane 16C is attached or connected to the upper surface of the valve base disk 16A. For example, the fluidizing membrane 16C (e.g. fluidizing plate) is attached by welding, brazing, soldering, and/or adhering the peripheral edge of the fluidizing membrane 16C to the upper surface of the valve base disk 16A. The upper surface of the valve base disk 16A and a lower surface of the fluidizing membrane 16C define a fluidizing chamber 16D or gas plenum, which is pressurized (i.e. described below) with a fluid (e.g. air, air mixture, gas, gas mixture, inert gas) to operate the fluidizing membrane 16C so that pressurized gas within the fluidizing chamber 16D is expelled through the fluidizing membrane 16C at a controlled constant or varying pressure.

The shape of the fluidizing chamber 16D (e.g. gas plenum) is shown in FIG. 4. The fluidizing chamber 16D is a space defined by the convex-shaped upper surface of the valve base disk 16A and a flat or concave lower surface of fluidizing membrane 16C having downwardly bent edges.

Alternatively, the fluidizing chamber 16D (e.g. gas plenum) can be provided with tailored flow surfaces, ridges, baffle arrangement, particular surface roughness, particular surface finish to direct or redirect the fluid flow from the fluidizing chamber 16D through the fluidizing membrane 16C to provide various fluidizing effects. For example, the fluidizing chamber 16D and/or fluidizing membrane 16C can be configured to evenly or alternatively focus the fluidizing effect to materials located above the fluidizing butterfly valve disk or member 16 during operation.

The fluidizing chamber 16D (FIG. 4) can be supplied with fluid, for example, pressurized air. The butterfly valve disk or member 16 is provided with a fluid passageway 16E in the rotatable shaft 16B communicating with a fluid passageway 16F in the valve base disk 16A. The end of the rotatable shaft 16B is fitted with a fluid coupling such as coupling 22 (FIGS. 1 and 2) for connecting the supply line 20 to the air or gas supply. The opposite end of the rotatable shaft 16B can also be fitted with a fluid passageway 16E and a fluid coupling such as coupling 22.

In fluidizing operation, pressurized air or other gas provided by the air or gas supply 18 flows under pressure through the fluid supply line 20, coupling 22, fluid passageway 16E, and fluid passageway 16F into the fluidizing chamber 16D. The pressurized air or other gas in the fluidizing chamber 16D is then expelled under pressure through the fluidizing membrane 16C into a space located above the fluidizing butterfly valve disk or member 16 to fluidize the material (e.g. bulk powder material) located above and in proximity to the fluidizing butterfly valve disk or member 16.

The air or gas supply 18 can be controlled (e.g. programmed computer controlled) to provide a steady state supply of air or other gas to the fluidizing chamber 16D. Alternatively, the air or gas supply 18 can be controlled to provide a varying pressure supply of air or other gas to the fluidizing chamber 16D. For example, a high pressure short-duration blast can be initially supplied to the fluidizing chamber 16D followed by a steady state pressure supply to create an initial blasting effect of the fluidizing air or other gas existing the fluidizing membrane 16C to loosen and dislodge the settled material located above the fluidizing butterfly valve disk or member 16 just prior to opening of the fluidizing butterfly valve 10. The steady state pressure supplied after the initial blasting operation assists material flow through the fluidizing butterfly valve disk or member in the partially or fully opened position (i.e. fluidized material then flows along the opened fluidizing membrane 16C aligned in the flow direction FD (FIG. 1)). Alternatively, the supply control for air or other gas can be turned on and off when the butterfly valve opens and closes with the pressure and flow manually preset.

Figure 5:
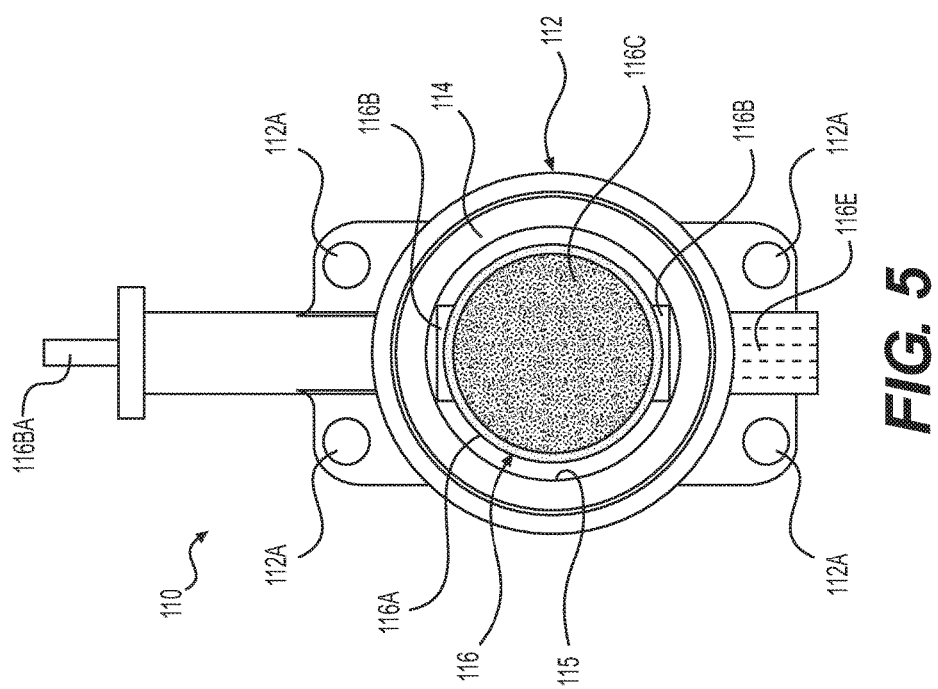
FIG. 5 is a top planar view of another butterfly valve.
Figure 6:
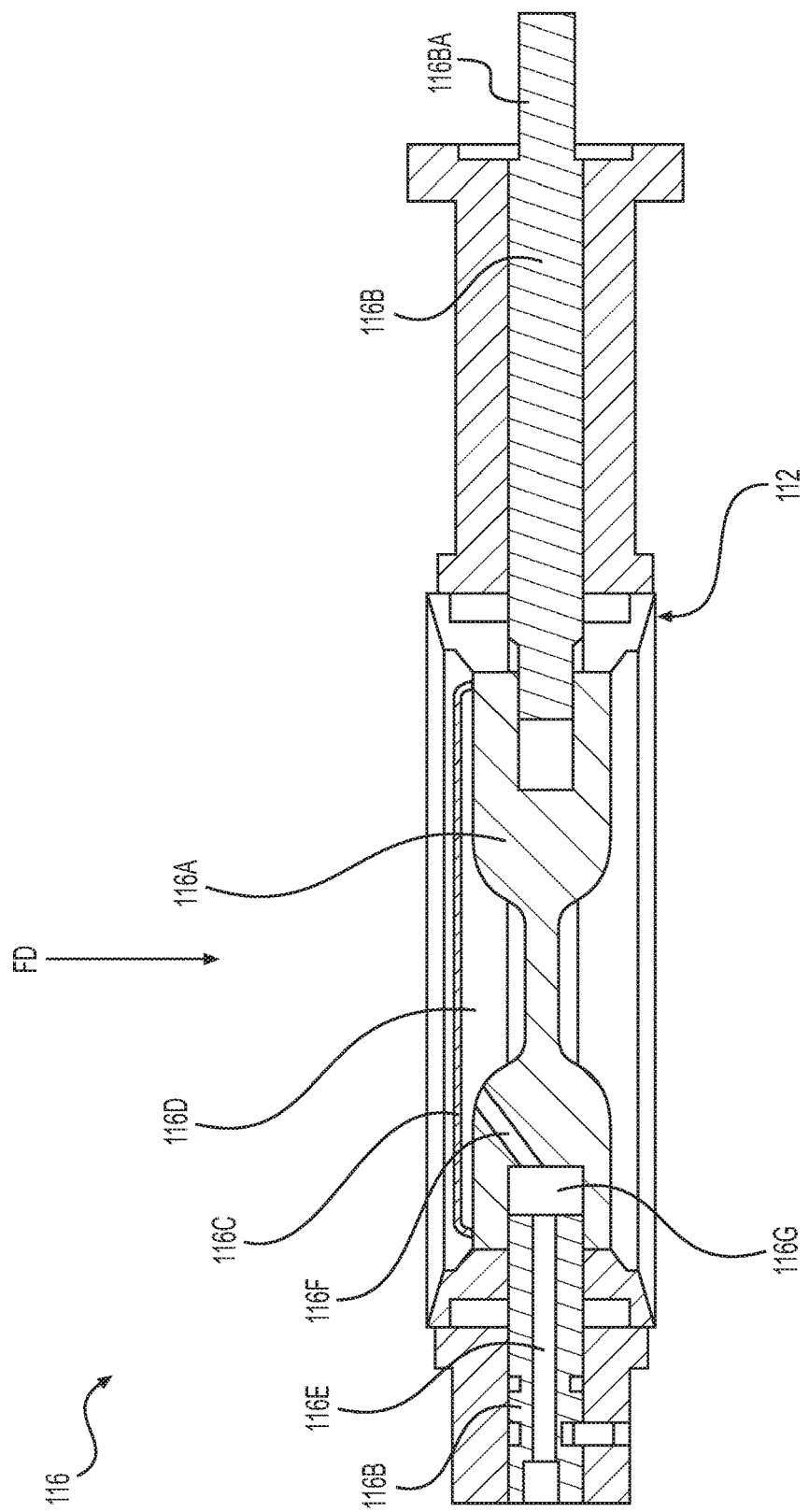
FIG. 6 is a cross-sectional side view of the butterfly valve shown in FIG. 5.
Figure 7:
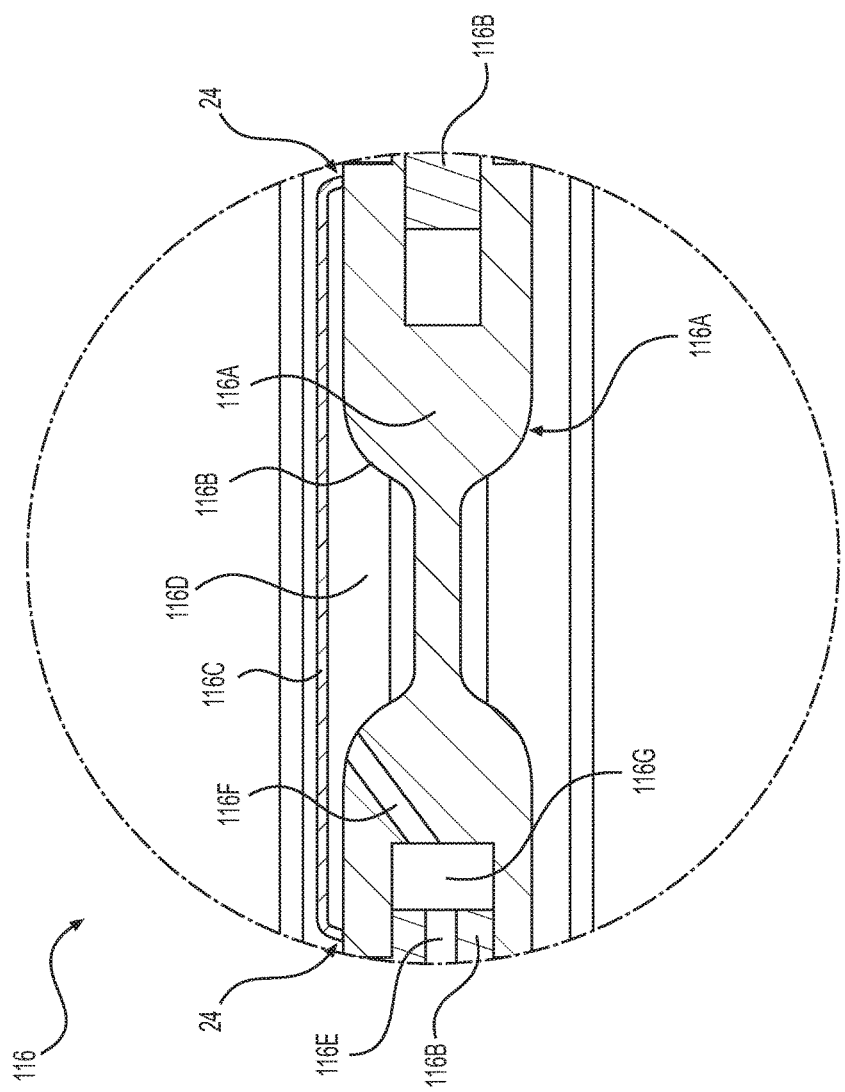
FIG. 7 is a broken away detailed cross-sectional view of the butterfly valve shown in FIG. 5.

Another fluidizing butterfly valve 110 is shown in FIGS. 5-7. The butterfly valve 110 comprises a valve body 112 having a valve seat or seal 114, and a fluidizing butterfly valve disk or member 116 rotatably disposed within the valve body 112. The valve body 112 is provided with through holes 112a for receiving bolts for connecting the fluidizing butterfly valve 110 to a lower exit end of a material hopper.

The butterfly valve disk or member 116 is configured to open and close a flow channel 115 directing flow along the flow direction FD (FIG. 6) through the valve body 112. The butterfly valve disk or member 116 comprises a valve base disk 116A, a rotatable shaft 116B, fluidizing membrane 116C, and a fluidizing chamber 116D.

The butterfly valve disk or member 116 is mounted on the rotatable shaft 116B (FIG. 6) disposed within the valve body 112, and configured to rotate the butterfly valve disk or member 116 to open and close the butterfly valve 110. The outer end 116BA of the rotatable shaft 116B can be gripped with a tool or handle for rotating the rotatable shaft 116B and butterfly valve disk or member 116.

The detailed configuration of the fluidizing butterfly valve disk or member 116 is shown in FIGS. 6 and 7. The valve base disk 116A, for example, can be made (e.g. machined, formed, molded) from metal or other suitable material (e.g. steel, aluminum, composite as described above for the valve base disk 116A), and have a center portion connected to rotatable shaft portion 116B when assembled together.

The fluidizing butterfly valve disk or member 116 is provided with a fluidizing membrane 116C on an upper side of the valve disk 116A. Alternatively, the butterfly membrane can be provided on the lower side of the valve base disk 116A, or on both the upper side and lower side of the valve disk 116A. The fluidizing membrane 116C can be a porous plate or other material described above for fluidizing membrane 16C. Alternatively, the valve base disk 116A can be a fluidizing plate made (e.g. machined, drilled, water jetted, lasered) to having multiple through holes or jets extending through the fluidizing plate. The through holes or jets can be in a particular pattern (e.g. matrix, radii, star, concentric circles). Further, the configuration of the through holes (e.g. different size through holes, different cross-sectional shaped through holes, tapering through holes, particular surface roughness and/or surface finish in through holes) can be tailored to create various fluidizing effects. Alternatively, the fluidizing plate can be a screen, or made from a screen material.

The fluidizing membrane 116C is attached or connected to the upper surface of the valve base disk 116A. For example, the fluidizing membrane 116C is attached by welding, brazing, soldering, and/or otherwise connecting a peripheral edge of the fluidizing membrane 116C to the upper surface of the valve base disk 116A. The upper surface of the valve base disk 116A and a lower surface of the fluidizing membrane 116C define the fluidizing chamber 116D, which is pressurized (i.e. described below) with fluid (e.g. air, air mixture, gas, gas mixture, inert gas, $N_2$) to operate the fluidizing plate 116C so pressurized fluid within the fluidizing chamber 116 is expelled through the fluidizing membrane 116C at a controlled constant or alternative varying pressure. The shape of the fluidizing chamber 116D is shown in FIGS. 6 and 7. The fluidizing chamber 116D is an annular space defined by a concave-shaped upper surface of the valve base disk 116A and a flat lower surface having downwardly bent edges of the fluidizing membrane 116C. Alternatively, the fluidizing chamber 116D can be provided with tailored flow surfaces, ridges, baffle arrangement, particular surface roughness, particular surface finish to direct or redirect the gas flow from the fluidizing chamber 116D through the fluidizing membrane 116C to provide various fluidizing effects. For example, the fluidizing chamber 116D and/or fluidizing plate 116C can be configured to evenly, or alternatively, focus the fluidizing effect to materials located above the fluidizing butterfly valve disk or member 16 during operation.

The fluidizing chamber 116D (FIG. 6) can be supplied with fluid, for example, pressurized air or other gas. For example, the butterfly valve disk or member 116 can be provided with a fluid passageways 116E and 116G extending through the rotatable shaft 116B communication with fluid passageway 116G and fluid passageway 116F in the valve base disk 116A. The end of the rotatable shaft 116B can be fitted with a coupling like coupling 22 (FIG. 1) for connecting the air or gas supply line 20 to the air or gas supply 18.

Figure 8:
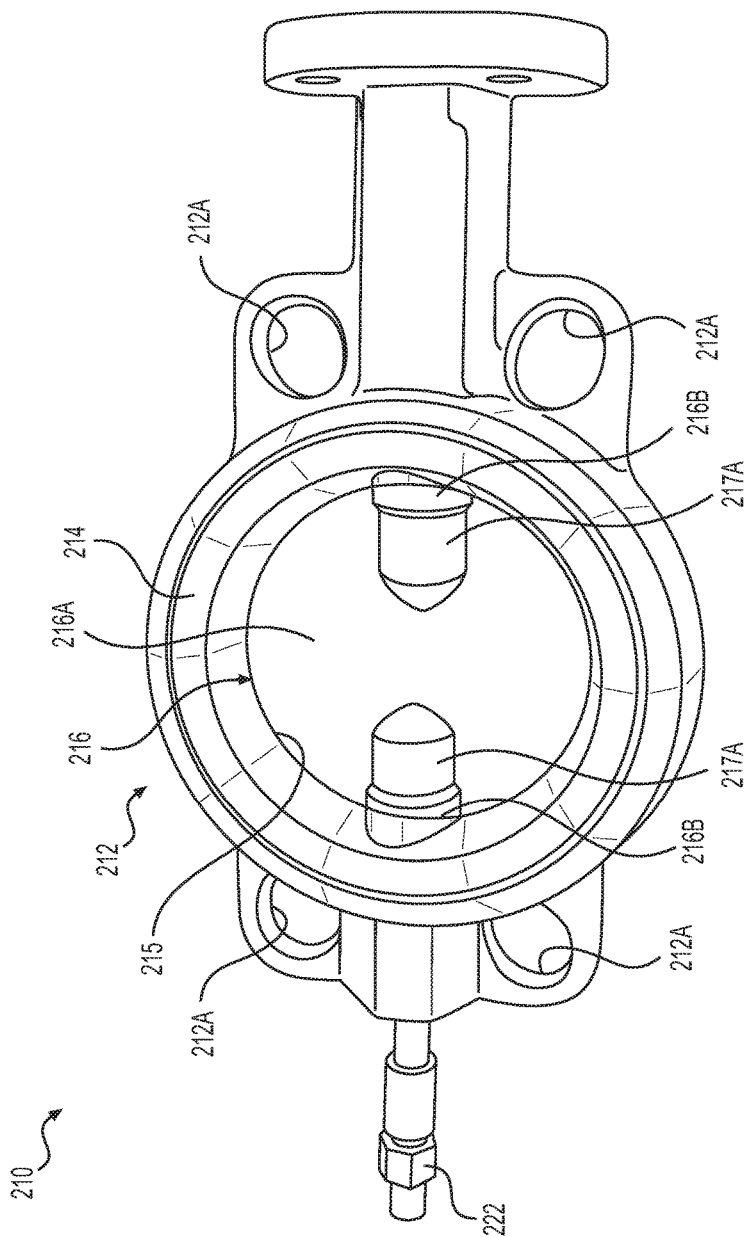
FIG. 8 is a top perspective view of a butterfly valve prior to application of a fluidizing surface with the butterfly valve disk or member closed.
Figure 9:
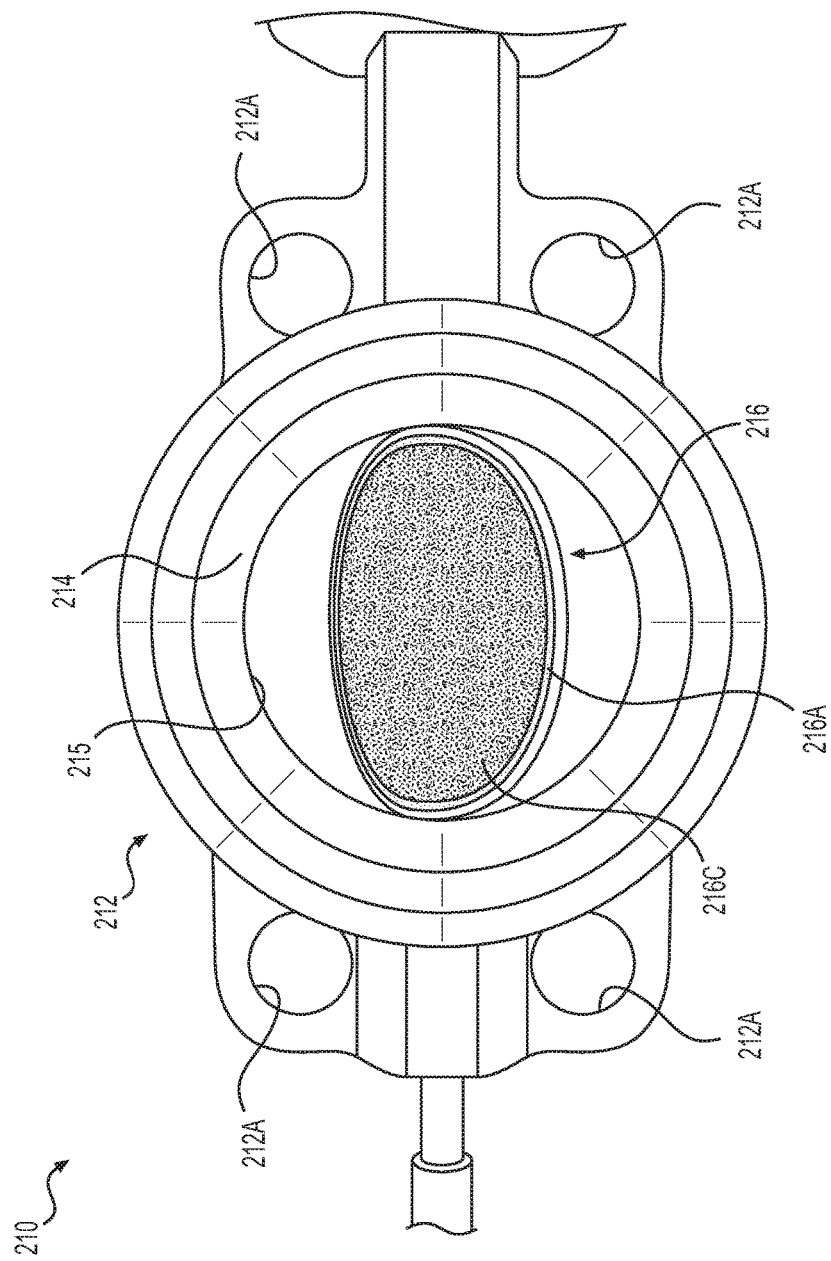
FIG. 9 is a top planar view of the butterfly valve shown in FIG. 8 with the fluidizing plate applied with the butterfly valve disk or member partially opened.
Figure 10:
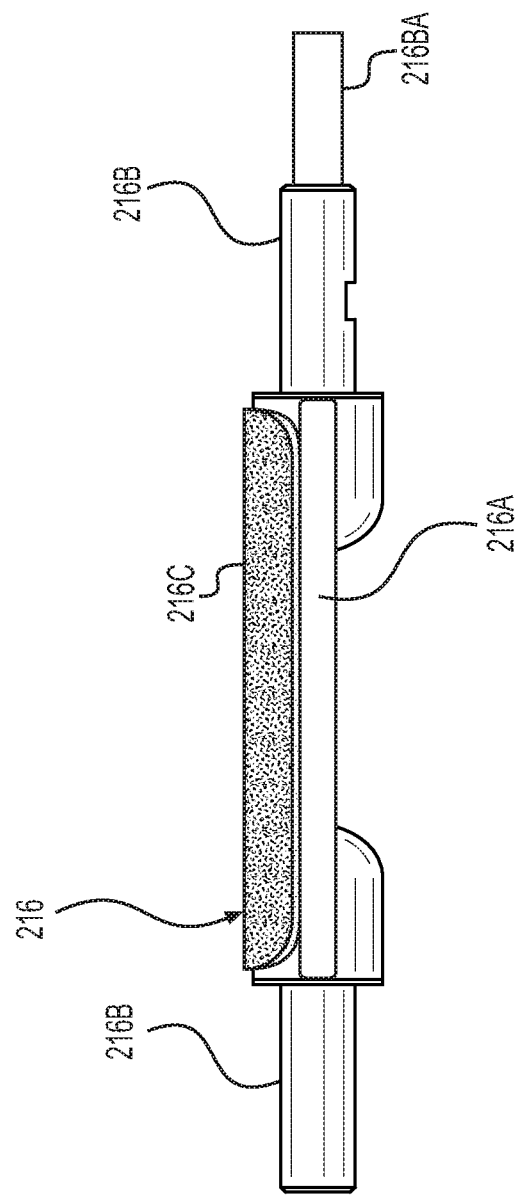
FIG. 10 is a side elevational view of the butterfly valve disk or member shown removed from the butterfly valve shown in FIGS. 8 and 9.

A further fluidizing butterfly valve 210 is shown in FIGS. 8-10. The butterfly valve 210 comprises a valve body 212 having a valve seat or seal 214, and a fluidizing butterfly valve disk or member 216 rotatably disposed within the valve body 212. The valve body 112 can be provided with through holes 212A for receiving bolts for connecting the fluidizing butterfly valve 210 to a lower exit end of a material hopper.

The fluidizing butterfly valve disk or member 216 comprises a valve base disk 216A, a rotatable shaft 216B, a fluidizing membrane 216C, and a fluidizing chamber 216D.

The butterfly valve disk or member 216 is configured to open and close a flow channel 215 directing flow along the flow direction through the valve body 212. The valve base disk 216A is mounted on rotatable shaft 216B (FIG. 8) disposed within the valve body 212, and configured to rotate the valve base disk 216A to open and close the butterfly valve 210. The outer end 216BA of the rotatable shaft 216B can be gripped with a tool or handle for rotating the rotatable shaft 216B and butterfly valve disk or member 216.

The butterfly valve disk or member 216 shown in FIG. 8 is shown without the fluidizing member 216C yet connected to the valve disk 216A. The butterfly valve disk or member 216 shown in FIGS. 9 and 10 shows the fluidizing member 216C connected to the valve disk 216A. The fluidizing member 216C may be made of any of the materials described for fluidizing member 16C.

In the butterfly valve disk or member 216 shown in FIG. 8, the rotatable shaft portion 216B includes trunnions 217A, which extend inwardly into the valve disk 216A. Thus, when the fluidizing membrane 216C is assembled onto the valve base disk 216A, the fluidizing membrane 216C covers the trunnions 217A of the rotatable shaft 216B.

Figure 11:
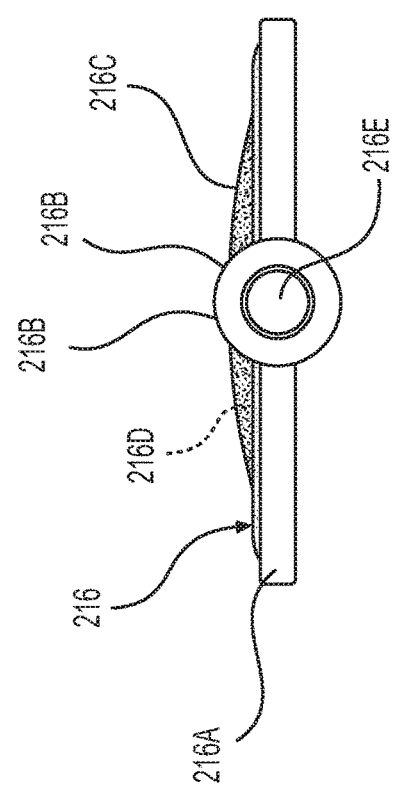
FIG. 11 is an end elevational view of the butterfly valve disk or member shown removed from the butterfly valve shown in FIG. 10.
Figure 12:
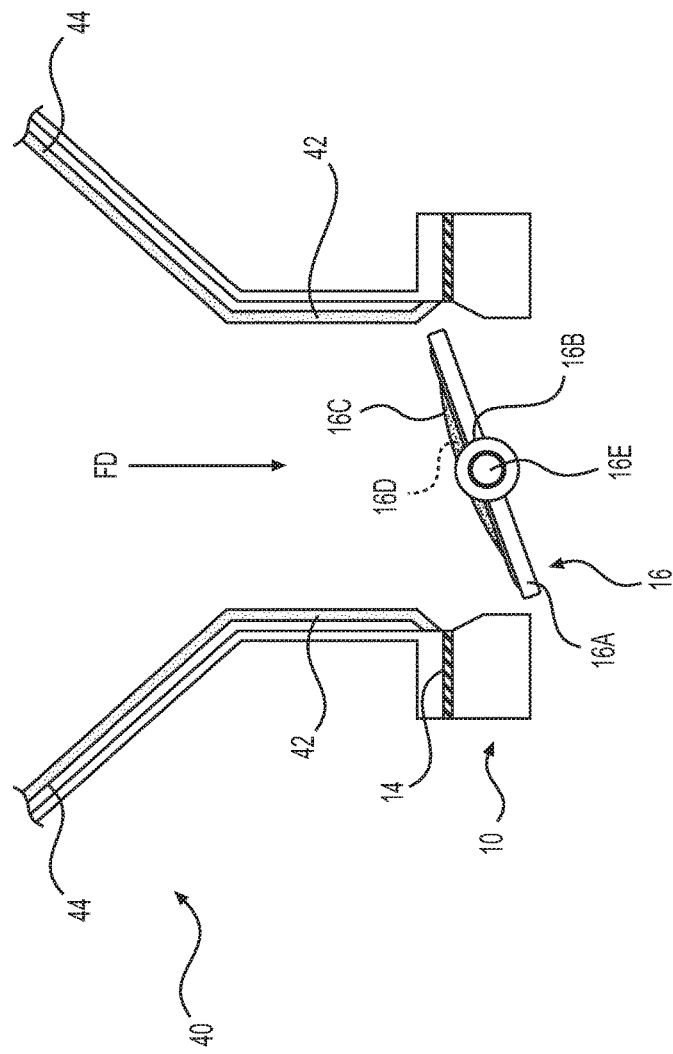
FIG. 12 is a diagrammatic view of the fluidizing butterfly valve installed on a fluidizing material hopper.

The detailed configuration of the fluidizing butterfly valve disk or member 216 is shown in FIGS. 9-11. The valve base disk 216A, for example, can be made (e.g. machined, formed, molded) from metal or other suitable material (e.g. steel, aluminum, ceramic, composite) as described above for valve base disk 16A.

The fluidizing butterfly valve disk or member 216 can be provided with the fluidizing membrane 216C provided on one or both sides of the valve disk 216A. FIGS. 9 and 10 show the fluidizing membrane 216C located on the upper side of the valve base disk 216A and, thus located on the upper side of the fluidizing butterfly valve disk or member 216. The fluidizing membrane 216C, for example, can be a porous plate from metal or other suitable material (e.g. steel, aluminum, ceramic, composite) as described above for fluidizing membrane 16C. Alternatively, the fluidizing membrane 216C can be a fluidizing plate made (e.g. machined, drilled, water jetted, laser cut) to have multiple through holes, jets, or otherwise passages extending through the fluidizing plate. The through holes or jets can be in a particular pattern (e.g. matrix, radii, star, concentric circles), or can be randomly arranged (e.g. like passageways in a sponge, like passageways in a sintered porous metal filter). Further, the configuration of the through holes (e.g. different size through holes, different cross-sectional shaped through holes, tapering through holes, particular surface roughness and/or surface finish in through holes) can be tailored to create various fluidizing effects. Alternatively, the fluidizing membrane 216C can be a screen, or made from a screen material.

The fluidizing membrane 216C is attached or connected to the upper surface of the valve disk 216A. For example, the fluidizing membrane 216C is attached by welding, brazing, soldering, and/or otherwise connecting a peripheral edge of the fluidizing membrane 216C to the upper surface of the valve base disk 216A. The upper surface of the valve base disk 216A and the lower surface of the fluidizing membrane 216C define the fluidizing chamber 216D, which is pressurized (i.e. described below) with fluid (e.g. air, air mixture, gas, gas mixture, inert gas, $N_2$) to operate the fluidizing membrane 216C so pressurized fluid within the fluidizing chamber 216D is expelled through the fluidizing membrane 216C at a controlled constant or varying pressure. The shape of the fluidizing chamber 216C shown in FIGS. 9 and 10. The fluidizing chamber 216C is an annular space defined by a concave-shaped upper surface of the valve base disk 216A and a flat lower surface having downwardly bent edges of the fluidizing membrane 216C. Alternatively, the fluidizing chamber 216D can be provided with tailored flow surfaces, ridges, baffle arrangement, particular surface roughness, particular surface finish to direct or redirect the gas flow from the fluidizing chamber 216D through the fluidizing plate 216C to provide various fluidizing effects. For example, the fluidizing chamber 216D and/or fluidizing plate 216C can be configured to evenly, or alternatively, focus the fluidizing effect to materials located above the fluidizing butterfly valve disk or member 216 during operation of the fluidizing effect.

The fluidizing chamber 216D can be supplied with fluid, for example, pressured air. For example, the butterfly valve disk or member 216 can be provided with a fluid passageway 116E extending through the rotatable shaft portion 216B in communication with the fluidizing chamber 216D. The end of the rotatable shaft portion 216A can be fitted with a coupling, supply and gas supply, like coupling 22 (FIG. 1) for connecting the air or gas supply line 20 to the air or gas supply 18, as shown in FIG. 1.

Proportional Operation

The fluidizing butterfly valve 10 can be configured with a pneumatic or electrical actuator and positioner, and operated to provide proportional control of the butterfly valve disk or member 16 to control the degree or extent of opening of the butterfly valve disk or member 16 during flow modulating operation of the fluidizing butterfly valve 10.

Fluidizing Butterfly Valve Application

The butterfly valve 10 shown in FIGS. 1-4 is installed at a lower exit end of a hopper 40. The hopper 40 is filled with a flowable material for storage and use thereof.

When the butterfly valve 10 is closed, the material sits on top of the butterfly valve disk or member 16 making it difficult to open the butterfly valve 10 due to the weight of the material. Further, depending on the material, conditions, and the time the butterfly valve 10 is closed, the material can adhere together and adhere to surfaces of the hopper and butterfly valve 10 clogging the butterfly valve, and increasing the difficulty of opening the butterfly valve, and establishing free and consistent flow of the material from the hopper.

The fluidizing air or gas supply 18 is opened to fluidize the material sitting on top of the butterfly valve disk or member 16. The material separates breaking up any agglomerated particulates, or otherwise freeing up the material, making is possible to then open the butterfly valve 10 without further compressing and/or compacting the material located above the butterfly valve disk or member 16.

The hopper 40, in addition or separately, can be provided with fluidizing elements 42 provided in the lower exit passageway of the hopper 40, and fluidizing elements 44 provided in a lower portion of the hopper 40. The fluidizing elements 42, 44 are configured to fluidize the material stored in the hopper 40 and located above the butterfly valve 10, in particular above the butterfly valve disk or member 16, when closed. Once the butterfly valve 10 is opened, the material flows through the flow channel while the material continues to be fluidized by the butterfly valve disk or member 16, preventing formation of a plug within the butterfly valve's flow channel.

Operation

In use, before the butterfly valve 10 is opened to empty a vessel located above the valve filled with a dry, finely-divided bulk solid, compressed air is applied to the fluidizing air supply nozzle to establish a flow of air through the fluidizing membrane and into the stored bulk solid resting on top of the valve disk. Evenly-distributed air flow, for example, issuing from thousands of micron-range pores in the fluidizing membrane and/or through holes/slots in the fluidizing plate, intensively fluidizes the bulk material near the valve disk, reducing the material's bulk density and greatly reducing the material's bulk shear strength. In the embodiment having a fluidizing plate having macro size hole and/or slots, this arrangement can also fluidize the bulk material near the valve disk.

Thus, the valve disk may then be opened easily without compacting the material above, and the bulk solid may then flow freely through the flow channel of the valve.

The described features in particular serve to establish and sustain free flow of the bulk solid through the valve in both fully-open and partially-open operating modes; the latter being especially important for applications in which proportional flow metering is required.

The invention claimed is:

1. A butterfly valve, comprising:
a valve body having a flow channel extending through the valve body;
a fluidizing butterfly valve disk or member rotatably disposed within the valve body and configured to open and close the flow channel; and
a rotatable shaft connected to the butterfly valve disk or member for opening and closing the butterfly valve disk or member within the valve body,
wherein the butterfly valve is configured to fluidize material located above the butterfly valve disk or member in a manner to facilitate opening the butterfly valve disk or member of the butterfly valve.

2. The valve according to claim 1, wherein the fluidizing butterfly valve disk or member comprises a valve base disk and an upper fluidizing membrane defining a fluidizing chamber.

3. The valve according to claim 2, wherein the fluidizing butterfly valve disk or member further comprises a lower fluidizing membrane defining another fluidizing chamber.

4. The valve according to claim 2, wherein the fluidizing membrane comprises a porous stainless steel sheet.

5. The valve according to claim 1, wherein the fluidizing butterfly valve disk or member comprises a valve base disk and a lower fluidizing membrane defining a lower fluidizing chamber.

6. The valve according to claim 1, wherein the fluidizing butterfly valve disk or member comprises an upper fluidizing plate having an upper fluidizing plate surface.

7. The valve according to claim 6, wherein the fluidizing plate comprises at least one through hole.

8. The valve according to claim 7, wherein the fluidizing plate comprises multiple through holes.

9. The valve according to claim 1, wherein the fluidizing butterfly valve disk or member comprises an upper fluidizing screen having the an upper fluidizing screen surface.

10. The valve according to claim 1, wherein the butterfly valve is configured to fluidize material passing through the flow channel of the butterfly valve.

11. The valve according to claim 1, wherein the rotatable shaft is configured to rotatably support the butterfly valve disk or member relative to the valve body within the flow channel of the valve body.

12. The valve according to claim 1, wherein the butterfly valve disk or member comprises a fluidizing plate defining a fluidizing chamber.

13. The valve according to claim 1, wherein the fluidizing butterfly valve disk or member comprises a fluidizing chamber.

14. The valve according to claim 13, wherein the rotatable shaft is configured to rotatably support the butterfly valve disk or member on the valve body within the flow channel of the valve body, and the rotatable shaft is provided with a fluid passageway extending from an end of the rotatable shaft to the fluidizing chamber.

15. The valve according to claim 1, wherein the fluidizing butterfly valve disk or member comprises a base disk and fluidizing membrane defining a fluidizing chamber.

16. The valve according to claim 1, wherein an upper surface of the base disk and a lower surface of the fluidizing membrane define the fluidizing chamber therebetween.

17. A butterfly valve system, comprising the butterfly valve according to claim 1.

18. The system according to claim 17, further comprising a fluid or gas supply connected to the butterfly valve.

19. The system according to claim 1,
wherein the rotatable shaft is configured to rotatably support the butterfly valve disk or member relative to the valve body within the flow channel of the valve body,
wherein the rotatable shaft extends into the flow channel of the valve body and is connected to the butterfly valve disk or member,
wherein the rotatable shaft is located aligned with a diameter of the butterfly valve disk or member,
wherein the fluidizing butterfly valve disk or member comprises a base disk and an upper fluidizing member defining a fluidizing chamber, wherein an upper surface of the base disk and a lower surface of the fluidizing member define the fluidizing chamber therebetween, said fluidizing member selected from the group consisting of a fluidizing membrane, a screen, and a fluidizing plate; and
wherein the rotatable shaft has at least one air or gas passageway extending from an end of the rotatable shaft to the fluidizing chamber, the at least one air or gas passageway for supplying air or gas from a pressurized gas or air supply to the fluidizing chamber, wherein the rotatable shaft passageway is located aligned with a diameter of the butterfly valve disk or member.

20. The system according to claim 19, wherein the upper fluidizing member is the fluidizing screen or fluidizing plate.

21. The system according to claim 19, wherein the upper fluidizing member is the fluidizing membrane.

22. The system according to claim 21, wherein the fluidizing membrane is a porous stainless steel sheet welded to a side or face of the base disk.

23. A butterfly valve, comprising:
a valve body having a flow channel extending through the valve body;
a fluidizing butterfly valve disk or member rotatably disposed within the valve body and configured to open and close the flow channel, the fluidizing butterfly valve disk or member comprising an upper fluidizing membrane; and
a rotatable shaft connected to the butterfly valve disk or member for opening and closing the butterfly valve disk or member within the valve body,
wherein the butterfly valve disk or member is configured to fluidize material located above the butterfly valve disk or member in a manner to facilitate opening of the butterfly valve disk or member of the butterfly valve.

24. A butterfly valve, comprising:
a valve body having a flow channel extending through the valve body;
a fluidizing butterfly valve disk or member rotatably disposed within the valve body and configured to open and close the flow channel, the fluidizing butterfly valve disk or member comprising a base disk and an upper fluidizing membrane defining a fluidizing chamber; and
a rotatable shaft connected to the butterfly valve disk or member for opening and closing the butterfly valve disk or member within the valve body,
the rotatable shaft having at least one air or gas passageway for supplying air or gas from a pressurized gas or air supply to the fluidizing chamber.

25. The system according to claim 24, wherein the rotatable at least one air or gas passageway for supplying air or gas from a pressurized gas or air supply to the fluidizing chamber comprises a first segment extending through the shaft and a second segment extending from the first segment to the fluidizing chamber.

* * * * *